No. 749,150. PATENTED JAN. 12, 1904.
T. W. BARBER.
MOTOR VEHICLE.
APPLICATION FILED JUNE 9, 1902.
NO MODEL. 5 SHEETS—SHEET 4.

Witnesses
Inventor
Thomas W. Barber
By Wm E Coulter
Attorney

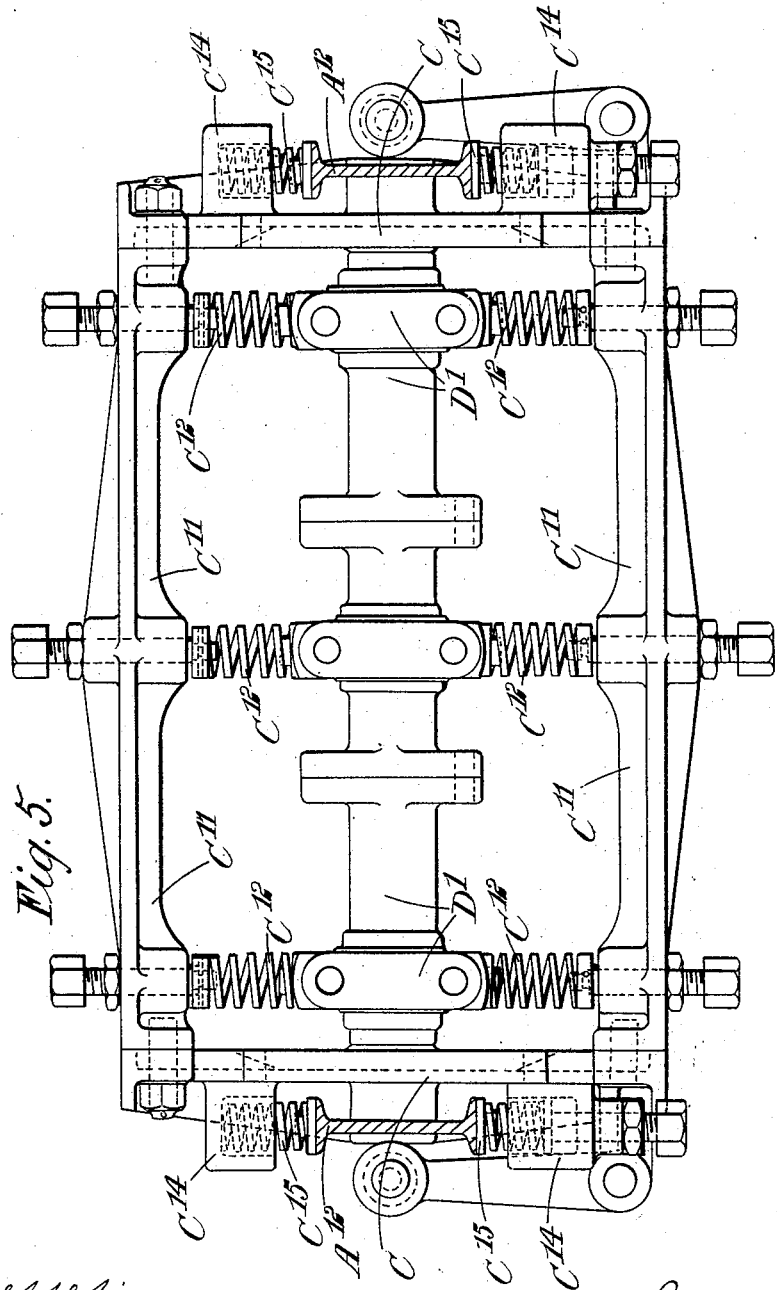

No. 749,150. Patented January 12, 1904.

UNITED STATES PATENT OFFICE.

THOMAS WALTER BARBER, OF LONDON, ENGLAND.

MOTOR-VEHICLE.

SPECIFICATION forming part of Letters Patent No. 749,150, dated January 12, 1904.

Application filed June 9, 1902. Serial No. 110,849. (No model.)

*To all whom it may concern:*

Be it known that I, THOMAS WALTER BARBER, a subject of the King of England, residing at London, England, have invented certain new and useful Improvements in or Relating to Driving-Gear for Road-Vehicles, of which the following is a specification.

This invention relates to improvements in motor-vehicles and the mechanism for propelling them. The whole of the driving mechanism is carried upon a rigid main frame of suitable dimensions. Two engines are provided, each carried independently by yielding connections from the main frame, and each engine drives onto a separate crank-shaft rigidly mounted in the main frame and extended beyond the same to carry the road-wheels. Each of the crank-shafts or crank-axles is connected with its road-wheel by a clutch which at the will of the driver may be made to engage the road-wheel with the axle or disengage it from the same, as desired.

Figure 1:
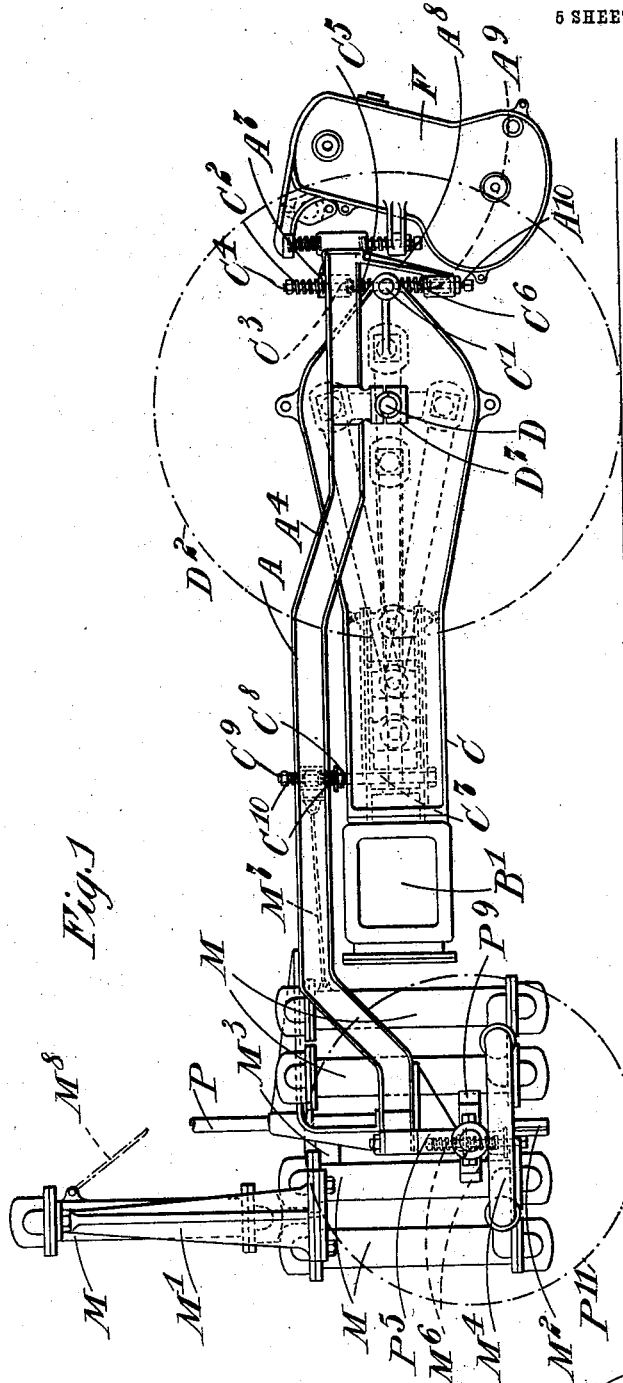
Figure 2:
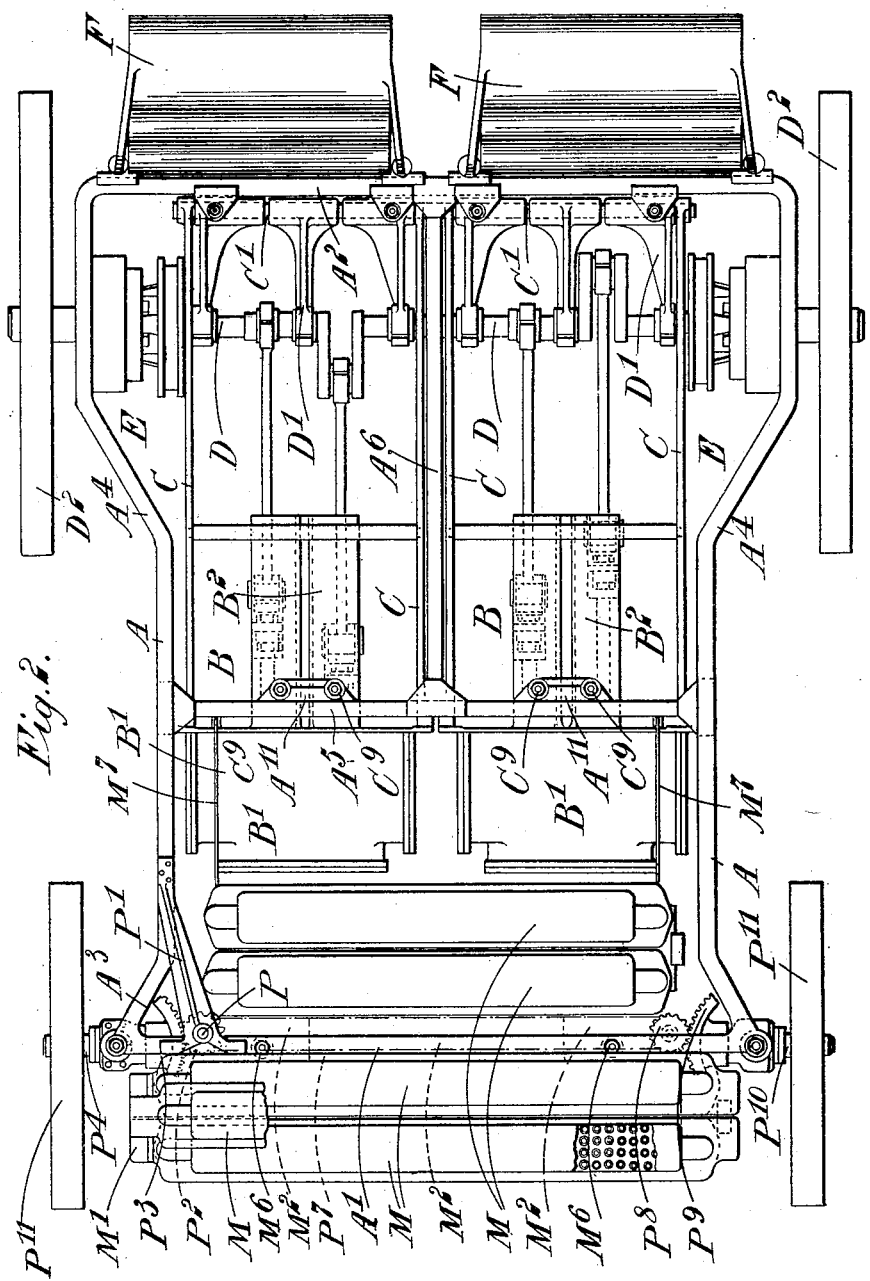
Figure 3:
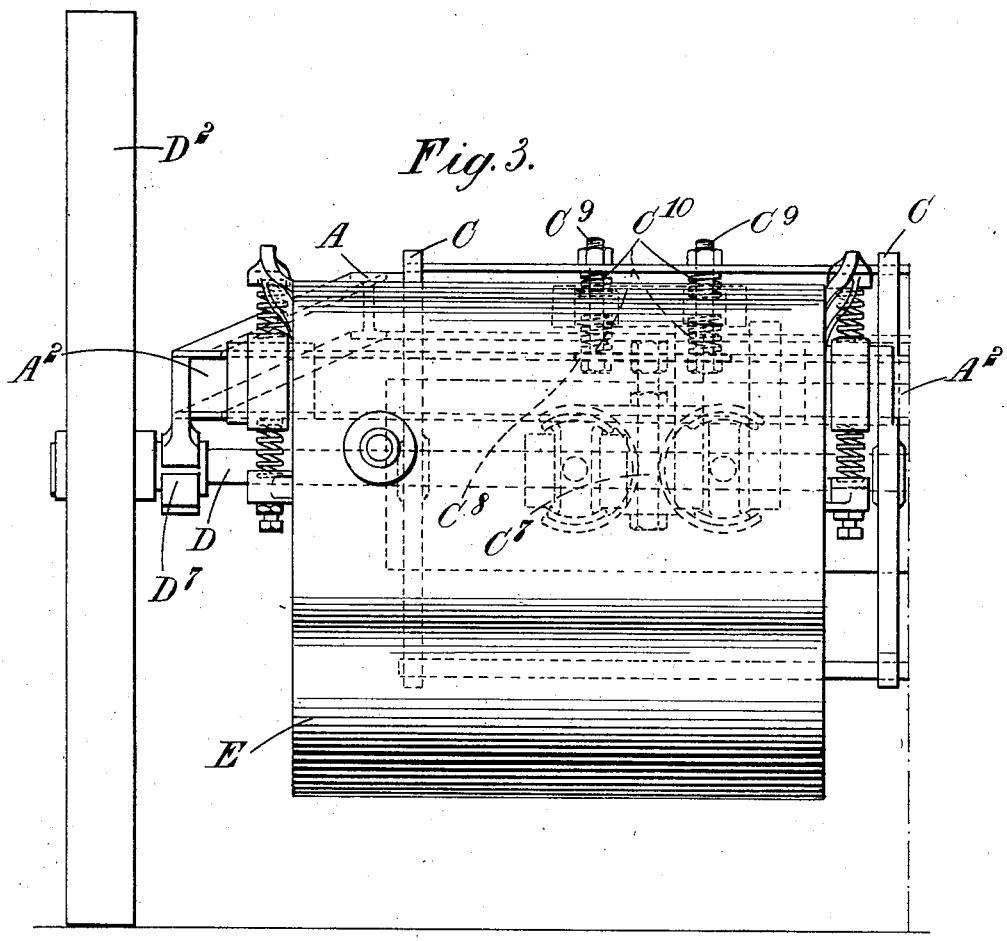
Figure 4:
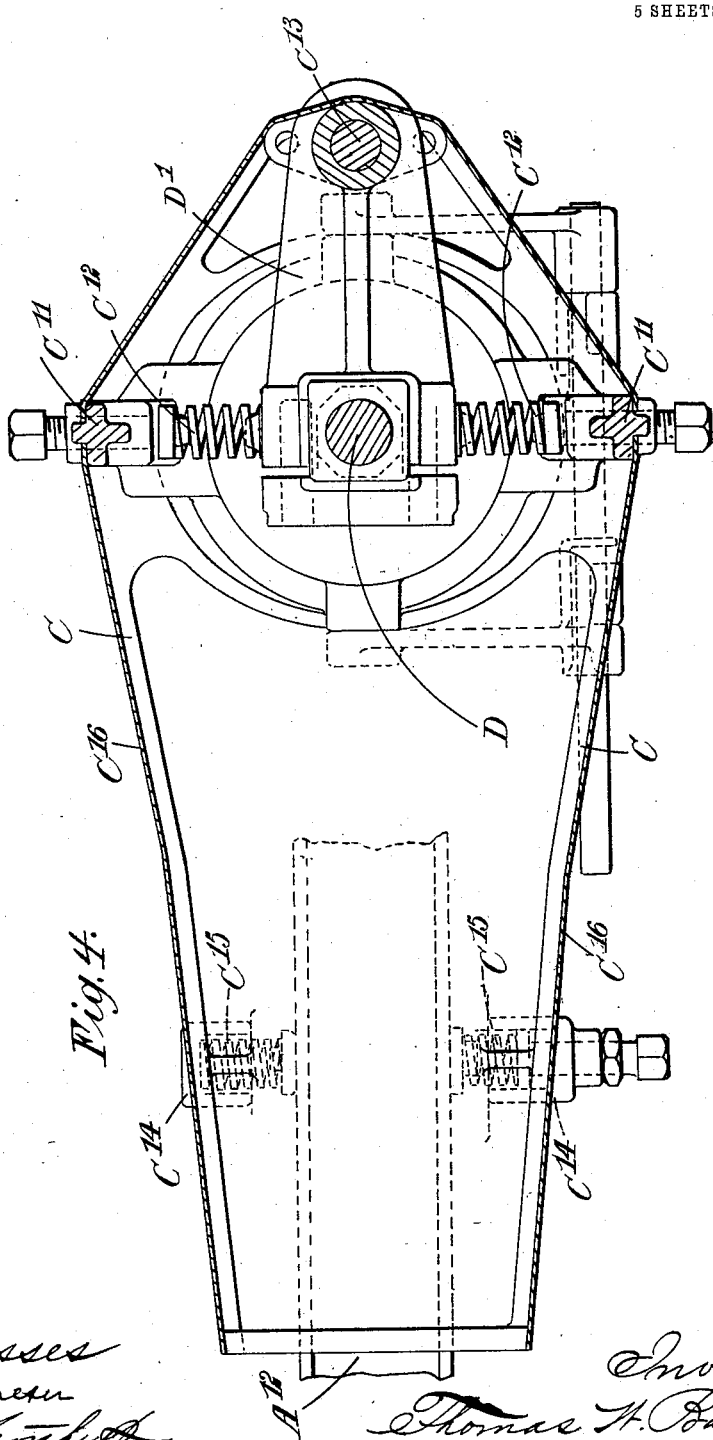

In the accompanying drawings, Figure 1 is a side elevation of the improved motor-vehicle, showing the frame and the engines suspended therefrom. Fig. 2 is a plan of the same. Fig. 3 is a rear elevation of the chassis of the vehicle, half only being shown. Fig. 4 is an elevation in part section of a modified construction of suspension for the engine. Fig. 5 is an end view of Fig. 4 from the left, the crank-shaft being removed.

Like letters indicate like parts throughout the drawings.

The main frame of the vehicle (illustrated in the drawings) is constructed of channel-steel and comprises two longitudinal side members A, connected together at their forward and rear ends by transverse members $A'$ $A^2$, respectively. The forward ends of the members A are bent outward at $A^3$ to permit the turning of the steering-wheels, and the rear ends of these members are also carried out laterally at $A^4$, so that the frame at the rear end is of greater width than at the center of its length. A longitudinal member $A^6$ extends from a point approximately midway of the length of the transverse member $A^5$ to the rear transverse member $A^2$ of the frame.

The main frame carries two engines B, each of which comprises a cylinder-casting $B'$, having secured to or made integral with it guides $B^2$ for the piston cross-heads. The engines shown in the drawings are each provided with two cylinders.

Each cylinder-casting is provided with side frames C, which extend in a rearward direction and lie in vertical planes parallel to the bores of the cylinders. The free ends of these side frames are pivotally connected to a transverse carrying-shaft $C'$, which is in turn supported by springs $C^2$ from the rear transverse member $A^2$ of the main frame. On the frame member $A^2$ cup-shaped lugs $A^7$ are mounted, through each of which projects a vertical rod $C^3$, secured to the carrying-shaft $C'$. The springs $C^2$, which are conveniently spiral springs, are placed over the upper ends of the rods $A^3$ and retained in place by a screw-threaded nut $C^4$.

To prevent undue movement of the carrying-shaft $C'$ in an upward direction, springs $C^5$ are inserted so that they bear against the upper side of the carrying-shaft and the under side of the lugs $A^7$. To further support the carrying-shaft $C'$, hangers $A^8$ are mounted on the frame member $A^2$, each of which supports a spring $C^6$, one end of which bears against the hanger and the other against the under side of the carrying-shaft $C'$. Suitable projections may be formed upon the under side of the carrying-shaft to retain the springs $C^5$ in place, and the hangers are provided with false bottoms $A^9$, adapted to be raised or lowered by adjusting screws $A^{10}$. The springs $C^6$, with their supporting-brackets, may be dispensed with, if desired, and the whole weight of that end of the side frames supported by the springs $C^2$.

The cylinder end of the side frames and the cylinder-casting $B'$ are supported from the transverse frame member $A^5$ by a vertical rod $C^7$, which engages at its lower end the guides $B^2$ and is secured at its upper end to a transverse plate $C^8$. On this transverse plate $C^{18}$ are mounted two vertical rods $C^9$, which pass through cup-shaped brackets $A^{11}$, similar to the brackets $A^7$. Springs $C^{10}$, Fig. 3, are mounted above and below the brackets $A^{11}$ in the same manner as the springs $C^2 C^5$.

Each engine is provided with a separate crank-shaft D, mounted in rigid bearings in the longitudinal members A $A^6$ of the main frame, and between the carrying-shafts $C'$ and crank-shafts D distance-arms $D'$ are mounted. Each crank-shaft is entirely independent of the other and carries a road-wheel $D^2$, so that the two shafts together form a divided crank-axle. Each wheel may be operatively connected with or disengaged from its crank-shaft at the will of the driver by means of a clutch E of any construction.

In Figs. 4 and 5 a modified construction of suspension is shown for the engine and side frames C. A cylinder-casting $B'$, although not shown in these figures, is secured to the side frames C, as before; but the frames in place of being supported at their free ends by the carrying-shaft $C'$ are supported from the crank-shaft D. For this purpose transverse members $C^{11}$ are secured to the side members C above and below the crank-shaft D and springs $C^{12}$ inserted between them and the crank-shaft. The free ends of the two side frames C of each engine are connected together by a cross-rod $C^{13}$, to which are pivoted the distance-arms $D'$, formerly pivoted to the carrying-shaft $C'$.

The cylinder end of the side frames C may be suspended, as before, from the frame member $A^5$, or should the form of the main frame permit it lugs $C^{14}$ may be formed at the top and bottom of the side frames on those faces remote from each other, so that springs $C^{15}$ may be inserted between them and a convenient portion of the frame, (indicated at $A^{12}$.) It will be noted that in this form of suspension the suspension-springs $C^{12}$ also lie within the casing.

The space between the side frames C in either construction of suspension may be covered in, as indicated in section at $C^{16}$, Fig. 4, so that the connecting-rods, crank-shaft, and other working parts are inclosed in a dust-proof casing.

By mounting the crank-axles D, which carry the road-wheels, in rigid bearings on the main frame a firm drive is obtained, while at the same time the engines, being carried by yielding connections from the main frame in the manner described, are free to vibrate about the crank-axle without interfering with their working.

In view of the fact that the engines are yieldingly mounted upon the frame flexible pipe connections are of course necessary between them and the generators, condensers, &c., employed.

What I claim as my invention, and desire to secure by Letters Patent, is—

1. In a motor-vehicle, the combination of a rigid frame, a horizontal driving-engine carried at both ends by yielding connections upon the rigid frame, a crank-shaft for the engine and fixed bearings in the rigid frame for the crank-shaft, substantially as set forth.

2. In a motor-vehicle, the combination of a rigid frame, a horizontal driving-engine carried at both ends by yielding connections upon the rigid frame, a crank-shaft for the engine, fixed bearings in the rigid frame for the crank-shaft and means for maintaining the distance between the working cylinder of the engine and the crank-shaft constant, substantially as set forth.

3. In a motor-vehicle, the combination of a rigid frame, a driving-engine, a crank-shaft for the engine, fixed bearings in the rigid frame for the crank-shaft, side frames rigidly secured to one end of the cylinder-casting and extending therefrom parallel with the cylinder-bore, a yielding connection between the cylinder-casting and the rigid frame, and a yielding connection between the forward end of the side frames and the rigid frame, substantially as set forth.

4. In a motor-vehicle, the combination of a rigid frame, a driving-engine, a crank-shaft, fixed bearings in the rigid frame for the crank-shaft, side frames rigidly secured to one end of the cylinder-casting and extending therefrom parallel with the cylinder-bore, a yielding connection between the cylinder-casting and the rigid frame, a tranverse carrying-shaft, a yielding connection between this carrying-shaft and the rigid frame, means for pivoting the free end of the side frames to this member and a distance-arm pivotally connecting the crank-shaft and the carrying-shaft, substantially as set forth.

5. In a motor-vehicle, longitudinal frame members A, transverse frame members $A'$, $A^2$, rigidly connecting the forward and rearward ends respectively of the longitudinal members A, an intermediate transverse member $A^5$ connecting the members A approximately midway of their length, an intermediate longitudinal member $A^6$ connecting the transverse members $A^5$, $A^2$ at points approximately midway of their length, an engine mounted on one side of the member $A^6$, an engine mounted on the other side of the member $A^6$, side frames rigidly secured to the cylinder-casting of one engine and extending rearwardly in vertical planes parallel to the bore of the cylinder, side frames rigidly secured in the same manner to the other engine, means for suspending the cylinder-casting of one engine by a yielding connection from the frame member $A^5$, means for similarly suspending the cylinder-casting of the other engine, a separate crank-shaft for each engine carried in bearings rigidly secured to the frame members A, driving-wheels carried in bearings rigidly secured to the frame members A, means for operatively connecting one driving-wheel with one crank-shaft, means for operatively connecting another driving-wheel with the other crank-shaft, a transverse carrying-shaft C', yielding connections for supporting this carrying-shaft from the main frame, means for pivoting the free ends of the side frames of one engine-casting to the shaft C', distance-arms between the crank-shaft of this engine and the transverse member and a second carrying-shaft C' connected in a similar manner with the main frame and second engine as set forth.

In testimony whereof I have signed my name to this specification in the presence of two subscribing witnesses.

THOMAS WALTER BARBER.

Witnesses:
R. E. DUNBAR KILBURN,
HARRY B. BRIDGES.